United States Patent
Yoshimoto et al.

(10) Patent No.: US 9,204,493 B2
(45) Date of Patent: Dec. 1, 2015

(54) SEAT HEATER WITH OVER-TEMPERATURE PROTECTION

(71) Applicant: Panasonic Intellectual Property Management Co., Ltd., Osaka-shi, Osaka (JP)

(72) Inventors: Koji Yoshimoto, Shiga (JP); Norio Abe, Shiga (JP); Masanori Nishikawa, Shiga (JP); Kazuaki Hioki, Shiga (JP); Yoshimitsu Fujiwara, Shiga (JP); Kazumi Nagayama, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/398,081

(22) PCT Filed: Jul. 23, 2013

(86) PCT No.: PCT/JP2013/004482
§ 371 (c)(1),
(2) Date: Oct. 30, 2014

(87) PCT Pub. No.: WO2014/017078
PCT Pub. Date: Jan. 30, 2014

(65) Prior Publication Data
US 2015/0108115 A1    Apr. 23, 2015

(30) Foreign Application Priority Data
Jul. 24, 2012   (JP) ................ 2012-163374

(51) Int. Cl.
*H05B 1/02* (2006.01)
*B60N 2/56* (2006.01)

(52) U.S. Cl.
CPC ............ *H05B 1/0238* (2013.01); *B60N 2/5685* (2013.01)

(58) Field of Classification Search
CPC .............. H05B 1/0236; H05B 3/0042; H05B 2203/029; B60N 2/5685
USPC .......... 219/483–487, 202, 203, 206, 507–511
See application file for complete search history.

(56) References Cited

U.S. PATENT DOCUMENTS 4,633,061 A    12/1986   Arikawa
8,884,191 B2 *   11/2014   Ogino et al. ................. 219/202

FOREIGN PATENT DOCUMENTS

CN      2612362 Y      4/2004
JP      60-14786      1/1985
(Continued)

OTHER PUBLICATIONS

International Preliminary Report on Patentability and Written Opinion, Jan. 2015; PCT/JP2013/004482 (8 pages).
(Continued)

*Primary Examiner* — Mark Paschall
(74) *Attorney, Agent, or Firm* — Hamre, Schumann, Mueller & Larson, P.C.

(57) ABSTRACT

A seat heater includes a seat-warming heater which is connected to a power source and warms a person sitting on a seat, an over-temperature-preventing part which disconnects the connection between the seat-warming heater and the power source when the over-temperature-preventing part is heated to a predetermined temperature so as to prevent over-temperature of the seat-warming heater, and a heater which heats the over-temperature-preventing part, wherein the over-temperature-preventing part is non-return type, and the heater for the over-temperature-preventing part is arranged to cover opposite portions of the over-temperature-preventing part, thereby realizing both higher output and improved safety.

10 Claims, 7 Drawing Sheets

(56) References Cited

FOREIGN PATENT DOCUMENTS

| | | |
|---|---|---|
| JP | 6-301427 | 10/1994 |
| JP | 2000-342382 | 12/2000 |
| JP | 2002-270338 | 9/2002 |
| JP | 2003-109721 | 4/2003 |

OTHER PUBLICATIONS

Chinese Office Action, Jun. 19, 2015; Chinese Patent Application No. 201380024992.5, with English translation of its Search Report (9 pages).

* cited by examiner

SEAT HEATER WITH OVER-TEMPERATURE PROTECTION

TECHNICAL FIELD

The present invention relates to a seat heater which is equipped in/on a seat of an automobile, etc. so as to warm a person sitting on the seat.

BACKGROUND ART

Some of conventional seat heaters include a heater which warms a seat, the heater being positioned between a skin of the seat and a main pad (i.e, a back side of the skin) in the automobile (for example, see Patent Document 1). The heater for warming the seat is driven to warm the person sitting on the seat. Thereby, the person can feel comfort when sitting on the seat in a cold season.

PATENT DOCUMENT

Patent Document 1: JP 2003-109721 A

FIG. 7 shows a seat heater 100 according to the Patent Document 1. As shown in FIG. 7, a seat-warming heater 101 of the seat heater 100 includes a seat-warming heater 101a disposed in a seat section of the seat, and a back-section-warming heater 101b disposed in a back section of the seat. Both of the seat-warming heater 101a and the back-section-warming heater 101b are formed by arranging electrical heater wires to meander at predetermined pitches on an entire surface of a base material.

The seat heater 100 further includes a temperature control means (not shown) such as a thermostat or a controller. The temperature control means of the seat heater 100 controls power supply from a power source 105 to the seat-warming heater 101.

In order to deal with a case where the power supply to the seat-warming heater 101 becomes uncontrollable such as a failure of the temperature control means, the seat heater 100 includes an over-temperature-preventing part 102 and a heater 103 for heating the over-temperature-preventing part 102. The over-temperature-preventing part 102 is activated when heated to a temperature equal to or greater than a predetermined temperature, and then breaks off the power supply from the power source 105 to the seat-warming heater 101. According to such a configuration, if a temperature of the seat-warming heater 101 exceeds the predetermined temperature due to such as the failure of the temperature control means, the over-temperature-preventing part 102 heated by the heater 103 is activated to break off the power supply to the seat-warming heater 101. It prevents the temperature of the seat-warming heater 101 from rising above the predetermined temperature, thereby ensuring safety.

The seat heater 100 according to Patent Document 1 uses the over-temperature-preventing part 102 of return-type for controlling the power supply to the seat-warming heater 101. The over-temperature-preventing part 102 of return-type, even if activated when an interior temperature of the automobile becomes high, will return when the interior temperature is lowered, and then resume the power supply to the seat-warming heater 101.

SUMMARY OF INVENTION

Technical Problem

In recent years, a hybrid automobile and an electric automobile are becoming popular. The automobiles have reduced exhaust heat of engines as compared to other vehicles, thereby making it impossible to provide an adequate automobile-interior heating with use of only the exhaust heat of the engines. Therefore, a seat heater which heats a sitting person directly is getting a more attention. With respect to the seat heater used in such automobiles, there are needs to improve its performance, in particular its temperature raising performance (higher output), in order to be compatible with heating in an automobile which has less exhaust heat of the engine.

In a high-output seat heater, however, a temperature rise of the seat-warming heater is fast as compared to the conventional seat heaters. Therefore, if the over-temperature-preventing part 102 of return-type of the seat heater 100 shown in Patent Document 1 returns after activated, the seat-warming heater 101 will warm the sitting person rapidly, thereby making a sensory temperature change of the sitting person large. Thus, there is still room for improvement with respect to comfort and safety of the sitting person in addition to high output of the seat heater 100.

Accordingly, it is an object of the present invention to solve the above problems and provide a seat heater which can achieve both high-output and improved safety.

Solution to Problem

In order to achieve the above object, the present invention may be a seat heater comprising:

a seat-warming heater which is connected to a power source and warms a person sitting on a seat;

an over-temperature-preventing part which disconnects the connection between the seat-warming heater and the power source when the over-temperature-preventing part is heated to a predetermined temperature, so as to prevent over-temperature of the seat-warming heater; and a heater which heats the over-temperature-preventing part, wherein the over-temperature-preventing part is non-return type, and the heater for the over-temperature-preventing part is arranged to cover opposite portions of the over-temperature-preventing part.

Effects of Invention

The seat heater of the present invention can achieve both high-output and improved safety.

BRIEF DESCRIPTION OF THE DRAWINGS

Features and aspects thereof of the present invention will become apparent from the following description taken in conjunction with the preferred embodiments for the appended drawings.

DESCRIPTION OF EMBODIMENTS

Figure 1:
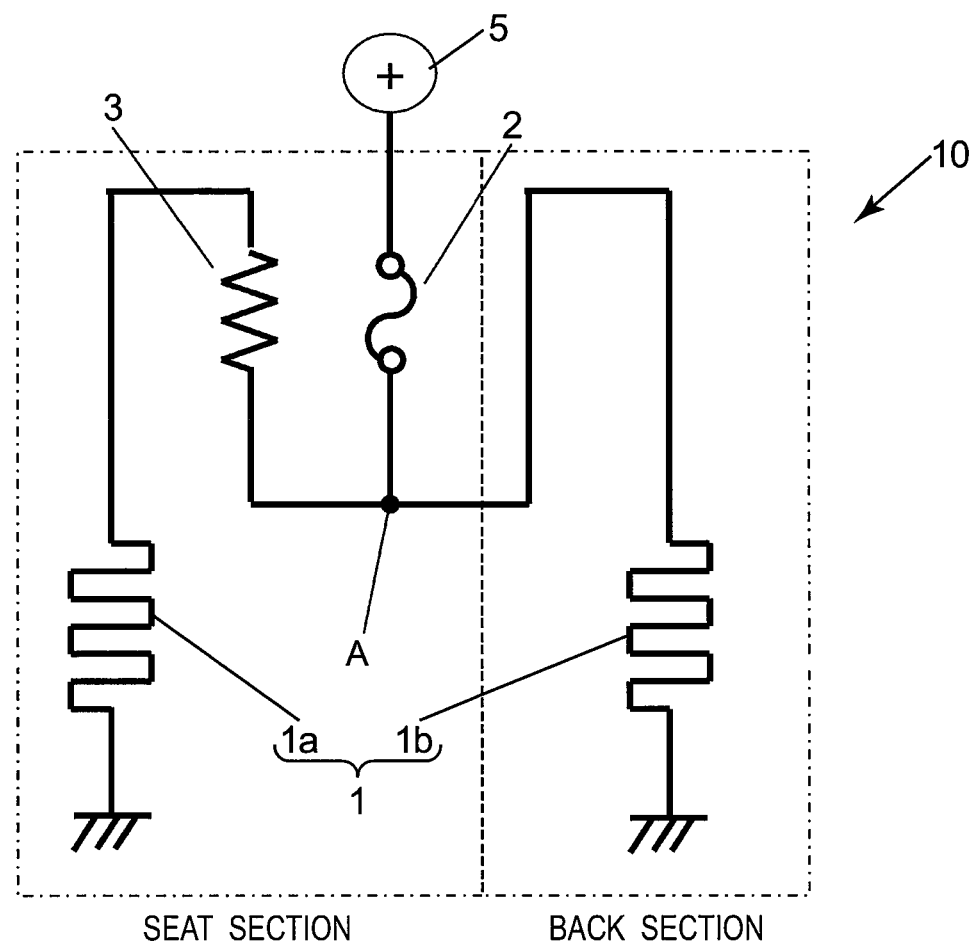
FIG. 1 is a circuit diagram of a seat heater according to Embodiment 1 of the present invention.
Figure 2:
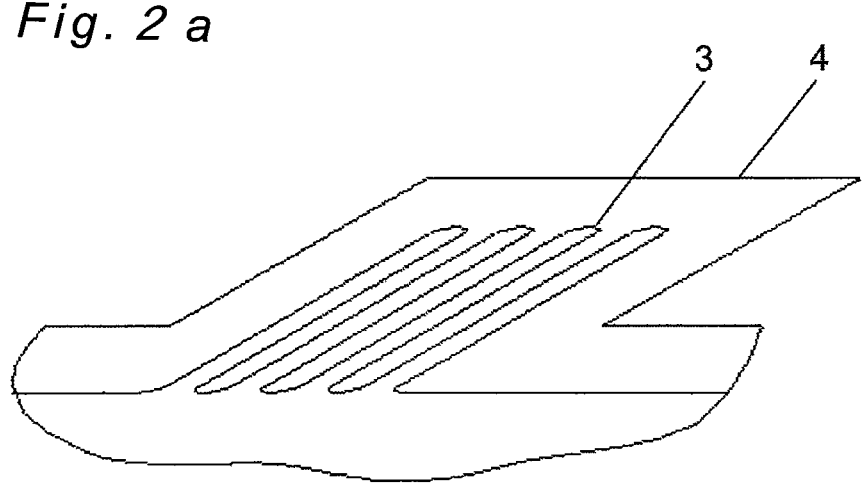
FIG. 2a is a schematic assembly diagram of an over-temperature-preventing part and a heater for the over-temperature-preventing part which the seat heater according to Embodiment 1 includes.
FIG. 2b is a schematic assembly diagram of the over-temperature-preventing part and the heater for the over-temperature-preventing part which the seat heater according to Embodiment 1 includes.
FIG. 2c is a schematic assembly diagram of the over-temperature-preventing part and the heater for the over-temperature-preventing part which the seat heater according to Embodiment 1 includes.
Figure 2:
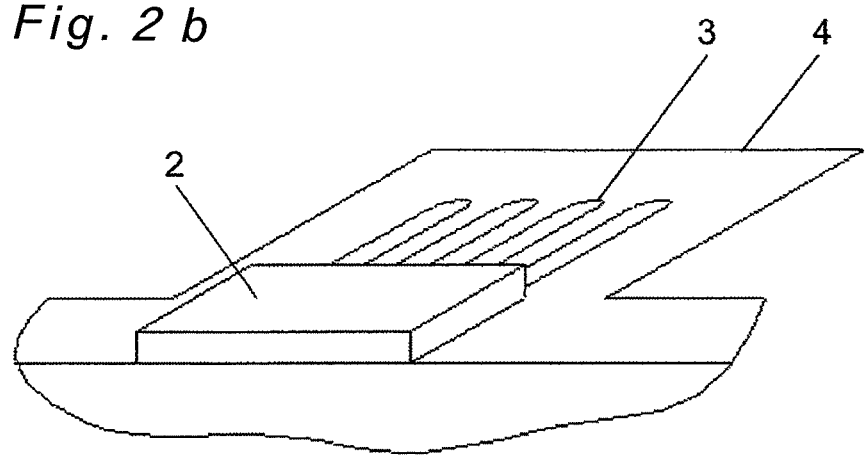
Figure 2:
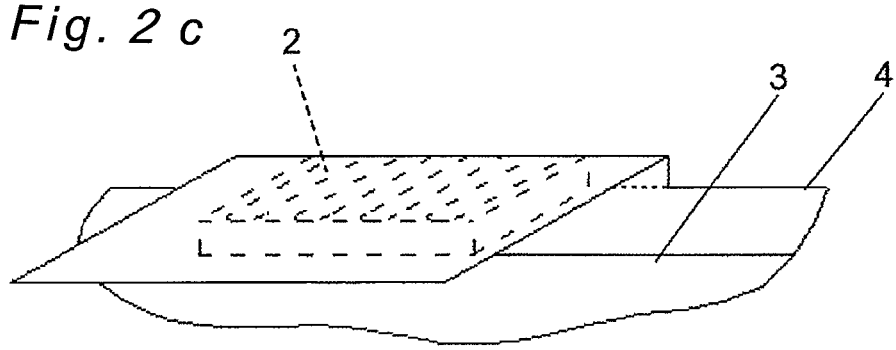

A first invention is a seat heater comprising:

a seat-warming heater which is connected to a power source and warms a person sitting on a seat;

an over-temperature-preventing part which disconnects the connection between the seat-warming heater and the power source when the over-temperature-preventing part is heated to a predetermined temperature, so as to prevent over-temperature of the seat-warming heater; and a heater which heats the over-temperature-preventing part, wherein the over-temperature-preventing part is non-return type, and the heater for the over-temperature-preventing part is arranged to cover opposite portions of the over-temperature-preventing part.

Thus, the heater for the over-temperature-preventing part covers opposite portions of the over-temperature-preventing part, making it possible to effectively heat the over-temperature-preventing part. This makes it possible to set an activation temperature of the over-temperature-preventing part to be high, for example, at a temperature zone above a maximum temperature in a vehicle where a seat heater is being used normally. Further, the over-temperature-preventing part is non-return type, thus it will not return after activated, thereby improving safety. Thus, high-output and improved safety can be both achieved.

A second invention is the seat heater of the first invention, wherein the seat-warming heater comprises a first seat-warming heater which warms a seat section of the seat and a second seat-warming heater which warms a back section of the seat, the first seat-warming heater and the second seat-warming heater being electrically-connected in parallel with each other, and wherein the over-temperature-preventing part is arranged between the power source and a connection point of the first seat-warming heater and the second seat-warming heater.

Thus, the first seat-warming heater warms a hip and a thigh of the sitting person, while the second seat-warming heater warms a back of the sitting person. This can improve comfort for the sitting person. Further, when the over-temperature-preventing part is activated, the power supply to the whole seat-warming heater can be stopped certainly, further improving safety.

A third invention is the seat heater of the second invention, wherein the heater for the over-temperature-preventing part comprises a first heater for the over-temperature-preventing part, which is electrically-connected in-series to the first seat-warming heater, and a second heater for the over-temperature-preventing part, which is electrically-connected in-series to the second seat-warming heater, and wherein both the first heater and the second heater for the over-temperature-preventing part heat the over-temperature-preventing part.

Thus, if an open circuit occurs in either the first or second seat-warming heater, the heater which is connected to the seat-warming heater where no open circuit occurs can heat the over-temperature-preventing part. This ensures a function of the over-temperature-preventing part even if the open circuit occurs, further improving safety.

A fourth invention is the seat heater of the third invention, wherein a heating value of the second heater for the over-temperature-preventing part is larger than a heating value of the first heater for the over-temperature-preventing part.

The first seat-warming heater to warm the seat-section receives a more weighted stress by the sitting person and thus may be likely to make the open circuit in comparison to the second seat-warming heater to warm the back-section. With this in mind, the heating value of the second heater for the over-temperature-preventing part, which is connected to the second seat-warming heater, is set to be larger than the heating value of the first heater for the over-temperature-preventing part. According to this configuration, the second seat-warming heater can heat the over-temperature-preventing part at a high temperature even if the first seat-warming heater has made the open circuit, making it possible to operate the over-temperature-preventing part more quickly and reliably. This further improves safety.

A fifth invention is the seat heater of the first invention, wherein the seat-warming heater comprises a first seat-warming heater which warms a seat section of the seat and a second seat-warming heater which warms a back section of the seat, the first seat-warming heater and the second seat-warming heater being electrically-connected in parallel with each other, wherein the heater for the over-temperature-preventing part comprises a first heater for the over-temperature-preventing part, which is electrically-connected in-series to the first seat-warming heater, and a second heater for the over-temperature-preventing part, which is electrically-connected in-series to the second seat-warming heater, the over-temperature-preventing part comprises a first over-temperature-preventing part which is electrically-connected in series to the first seat-warming heater and the first heater for the over-temperature-preventing part, and a second over-temperature-preventing part which is electrically-connected in series to the second seat-warming heater and the second heater for the over-temperature-preventing part, and wherein the first heater for the over-temperature-preventing part heats the first over-temperature-preventing part, and the second heater for the over-temperature-preventing part heats the second over-temperature-preventing part.

The provision of the first and second over-temperature-preventing parts, which are connected with each other in parallel, can reduce current flowing through the individual over-temperature-preventing parts. This can realize smaller over-temperature-preventing parts, making it possible to do easy arrangement of the over-temperature-preventing parts inside the seat, and thus to avoid prominence of the parts to the seat surface.

A sixth invention is the seat heater of any one of the first invention through the fifth invention, wherein the over-temperature-preventing part and the heater for the over-temperature-preventing part are arranged in positions not to contact the person sitting on the seat.

The over-temperature-preventing part and the heater for the over-temperature-preventing part are likely to have higher temperatures than the seat-warming heater. With this in mind, disposing the over-temperature-preventing part and the heater for the over-temperature-preventing part not to contact the sitting person can eliminate discomfort of the sitting person, and thus provide a comfortable sitting feeling.

A seventh invention is the seat heater of any one of the first invention through the sixth invention, wherein the over-temperature-preventing part and the heater for the over-temperature-preventing part are mechanically-secured.

Thus, heat transfer between the over-temperature-preventing part and the heater for the over-temperature-preventing part can be ensured, thereby making it possible to operate the over-temperature-preventing part reliably when abnormal circumstances occur. This further improves safety.

A eighth invention is the seat heater of any one of the first invention through the seventh invention, wherein the heater for the over-temperature-preventing part are arranged so that a part of heating wires constituting the heater for the over-temperature-preventing part has no contact with the other parts of the heating wires.

Thus, the over-temperature-preventing part always exists between the heating wires of the heater for the over-temperature-preventing part, thereby preventing dangerous temperatures of the heating wires, which may occur if they are in contact with each other. This further improves safety.

Hereinafter, Embodiments 1-4 of the present invention will be described with reference to the drawings. Embodiments 1-4 do not limit the present invention.

(Embodiment 1)

A seat heater 10 according to Embodiment 1 of the present invention will be described with reference to FIGS. 1 and 2a-2c.

FIG. 1 is a circuit diagram of the seat heater 10 according to Embodiment 1. As shown in FIG. 1, the seat heater 10 includes a seat-warming heater 1, an over-temperature-preventing part 2, and a heater 3 which heats the over-temperature-preventing part.

The seat-warming heater 1 is to be disposed in a seat of an automobile (not shown), etc. and to warm a person sitting on the seat (sitting person). A supply of electric power from a power source 5 energizes the seat-warming heater 1 to warm the sitting person. For example, as the power source 5, a power source installed in the automobile may be used. In Embodiment 1, the seat-warming heater 1 is made to be planar by arranging electric heater wires to meander at predetermined pitches on a base material such as a non-woven fabric or an urethan which has heat tolerance (explained below with reference to FIG. 2).

The seat-warming heater 1 in Embodiment 1 includes a seat-section-warming heater 1a (first seat-warming heater 1a), which is disposed at a seat section of the seat to warm mainly a thigh and a hip of the sitting person, and a back-section-warming heater 1b (second seat-warming heater 1b), which is disposed at a back section of the seat to warm mainly a back of the sitting person.

The heater 3 for the over-temperature-preventing part is connected to the seat-section-warming heater 1a. A series circuit including the seat-section-warming heater 1a and the heater 3 for the over-temperature-preventing part is connected to the back-section-warming heater 1b at a connection point A in parallel. Between the connection point A and the power source 5, the over-temperature-preventing part 2 is connected (disposed). The over-temperature-preventing part 2 can be activated when it is heated to a predetermined temperature by the heater 3 for the over-temperature-preventing part, thereby terminating electrical connection between the power source 5 and the seat-warming heater 1. In Embodiment 1, as the over-temperature-preventing part 2, a thermostat of non-return type may be used, for example.

It should be noted that the over-temperature-preventing part 2 of non-return type means those other than an over-temperature-preventing part of return-type which returns automatically. The over-temperature-preventing part 2 of non-return type may be a temperature fuse, a thermostat of manual-return-type which returns by button operation, etc., or a thermostat which returns when it is cooled to minus tens of degrees and thus does not return automatically under normal circumstances, or the like.

In addition, a temperature control means (not shown) such as a thermostat or a thermistor, using a signal of a temperature sensing element, is connected to the seat heater 10. The temperature control means of the seat healer 10 controls the power supply from the power source 5 to the seat-warming heater 1.

FIGS. 2a-2c are schematic assembly diagrams of the over-temperature-preventing part 2 and the heater 3 for the over-temperature-preventing part of the seat heater 10 according to Embodiment 1. As shown in FIG. 2a, the heater 3 for the over-temperature-preventing part is made by arranging heater wires on a base material 4 (which is made by a non-woven fabric in Embodiment 1). Next, as shown in FIG. 2b, the over-temperature-preventing part 2 is disposed on the heater 3 for the over-temperature-preventing part and the base material 4. By folding the base material 4 and the heater 3 for the over-temperature-preventing part, the heater 3 for the over-temperature-preventing part is disposed to sandwich the over-temperature-preventing part 2 as shown in FIG. 2c. That is, the heater 3 for the over-temperature-preventing part has contact with opposite portions of the over-temperature-preventing part 2 (corresponding to upper and lower surfaces in FIGS. 2b and 2c) and covers the over-temperature-preventing part 2. The heater 3 for the over-temperature-preventing part, in the folded state, has been sewn to the base material 4 such that the heating wires of the heater 3 do not have contact with each other and do not protrude from two surfaces of the over-temperature-preventing part 2 (corresponding to the upper and lower surfaces in FIGS. 2b and 2c), the surfaces being temperature-sensitive and having largest areas of the over-temperature-preventing part 2. This sewing form can eliminate a possibility for generation of smoke or fire, etc. The base material 4 folded as shown in FIG. 2c are to be bonded together by double-sided tapes at three opened sides (left, right, and near sides in FIGS. 2b and 2c). This can close openings of the base material 4, thereby preventing detachment of the over-temperature-preventing part 2 from the base material 4.

While FIGS. 2b and 2c show a rectangular parallelepiped shape of the over-temperature-preventing part 2, it should be noted that its shape is not limited thereto and may be a more elongated shape, a cylindrical shape, a button shape, or the like.

An activation temperature of the over-temperature-preventing part 2 (a temperature at which the over-temperature-preventing part 2 terminates the electrical connection between the power source 5 and the seat-warming heater 1) may be set to be above a maximum temperature in the automobile where the seat heater 10 is being used normally and below a melting temperature or an ignition temperature of neighboring components. Since the temperature in the automobile may reach at or above 70° C. in summer, the activation temperature of the over-temperature-preventing part 2 is set at about 80° C. in Embodiment 1. This activation temperature can avoid unsafety.

With respect to the above-described seat heater 10, its operation and action will be explained below.

In order to operate the seat heater 10, the temperature control means (not shown) controls the power source 5 to provide the power supply to the seat-warming heater 1 (rendering ON state), and then the seat-warming heater 1 heats the surfaces of the seat. If the temperature of the seat-warming heater 1 reaches a predetermined temperature (for example, 40° C.), the temperature control means controls the power source 5 to stop the provision of the power supply to the seat-warming heater 1 (rendering OFF state). Thereafter, if the temperature of the seat-warming heater 1 is reduced to a constant temperature (for example, 39° C.) lower than the predetermined temperature, or a predetermined time (for example, one minute) elapses, the temperature control means controls the power source 5 to resume the power supply to the heater 1 (rendering ON state). Such a temperature control to alternate the ON/OFF state can maintain the surfaces of the seat at a comfortable temperature for the sitting person.

The seat heater 10 according to Embodiment 1 includes, in addition to the temperature control means (not shown), the over-temperature-preventing part 2 and the heater 3 for the over-temperature-preventing part 2. Accordingly, even if the temperature control means breaks down and the power source 5 continuously provides the power supply to the seat-warming heater 1, the heater 3 for the over-temperature-preventing part continues to heat the over-temperature-preventing part, thereby stopping the provision of the power supply to the seat-warming heater 1 when the temperature of the over-temperature-preventing part 2 has reached the predetermined temperature. This reduces discomfort of the sitting person and improves safety.

In Embodiment 1, the over-temperature-preventing part 2 is non-return type. If the over-temperature-preventing part 2 of non-return type is heated to the predetermined temperature, the seat-warming heater 1 will not return then and be kept stopping. This certainly blocks the power supply to the seat-warming heater 1 and keeps it unusable.

Conventionally, an over-temperature-preventing part is return-type and, even if activated (rendering OFF state) improperly when the temperature in the automobile is high, this will return in a normal state (rendering ON state) when the temperature in the automobile is lowered afterwards. Furthermore, in consideration of a case where the over-temperature-preventing part also breaks down, heat generation densities of the respective heaters are reduced below predetermined densities, thereby enabling activation at a safe temperature which do not leads to unsafety. However, in recent years, it is desired to apply a seat heater to an automobile such as a hybrid car or an electric car which has difficulty in doing indoor-heating with use of exhaust heat of its engine. For such cases, further improvement of seat heater performance, in particular improved temperature raising performance (higher output), is required and thus high densities of its heater wires becomes essential Since the over-temperature-preventing part 2 in Embodiment 1 is non-return type, thereby improving safety under a high-output circumstance. Thus, safety can be ensured while gaining higher output of the seat heater 10 because of the high densities of the heat wires. That is, higher output and improved safety can be both achieved.

The heater 3 for the over-temperature-preventing part is disposed to sandwich the over-temperature-preventing part 2.

That is, the heater 3 for the over-temperature-preventing part is disposed to cover the opposite portions including at least the temperature-sensitive portions of the over-temperature-preventing part 2, making it possible to heat efficiently the over-temperature-preventing part 2. This can increase the temperature of the over-temperature-preventing part 2 to a temperature zone above the maximum temperature in the automobile where the seat heater 10 is being used normally. Therefore, it is also possible to set the activation temperature of the over-temperature-preventing part 2 to the temperature zone exceeding a temperature range in the automobile where the seat heater 10 is being used normally. Such a setting can avoid a trouble, in which, even when the seat heater 10 is properly operating, the over-temperature-preventing part 2 is activated in a normal temperature range in the automobile and then stops the power supply to the seat-warming heater 1.

According to Embodiment 1, the over-temperature-preventing part 2 is disposed in a position nearer to the power source 5 than the connection point A of the parallel circuits including the seat-section-warming heater 1a and the back-section-warming heater 1b of the seat-warming heater 1. Thus, it is possible to stop the power supply to the whole seat-warming heater 1 if an abnormal circumstance occurs, thereby improving merchantability and safety of the seat heater 10.

Resistance values of the seat-section-warming heater 1a and the back-section-warming heater 1b might be reduced in order to realize higher output of the seat-warming heater 1. For this purpose, it can be considered to thicken the heater wires of the seat-section-warming heater 1a and the back-section-warming heater 1b. On the other hand, in Embodiment 1, the seat-section-warming heater 1a and the back-section-warming heater 1b are electrically-connected in parallel, thereby reducing current flowing through the seat-section-warming heater 1a and the back-section-warming heater 1b. Thus, without thickening the heater wires, it is possible to achieve higher output of the seat heater 10 and to prevent cost-up of the heater wires or its prominence to the seat surfaces, thereby improving a commercial value of the seat heater 10.

According to Embodiment 1, one over-temperature-preventing part 2 of non-return type is provided, but in addition to that, another over-temperature-preventing part of return-type (for example, a thermostat) having a lower activating temperature than the over-temperature-preventing part 2 may be provided. According to such a configuration, when the temperature control means breaks down, the over-temperature-preventing part of return type is activated firstly, preventing over-heat of the seat-warming heater 1. Further, if the over-temperature-preventing part of return-type breaks down or has been heated to the activation temperature of the over-temperature-preventing part of non-return type, the over-temperature-preventing part 2 of non-return type is activated, stopping the power supply to the seat-warming heater 1. This can further improve safety. Also, the activation temperature of the over-temperature-preventing part of return type is set to be lower than the activation temperature of the over-temperature-preventing part 2 of non-return type, which leads to lowering of sensory temperature of the sitting person before or after the activation of the over-temperature-preventing part of return type. This can improve comfort for the sitting person.

In addition, the base material 4, where the over-temperature-preventing part 2 and the heater 3 for the over-temperature-preventing part are disposed, may be arranged at a position not to contact with the sitting person. A temperature of the base material 4 is relatively high, in particular, where the over-temperature-preventing part 2 and the heater 3 for the over-temperature-preventing part are provided. Thus, arranging the base material 4 at the position not to contact with the sitting person can avoid a feeling of heat caused by the over-temperature-preventing part 2 and the heater 3 for the over-temperature-preventing part and further prevent uncomfortableness which may be caused by contact with the over-temperature-preventing part 2. Thus, a comfortable sitting feeling can be realized.

In addition, the over-temperature-preventing part 2 and the heater 3 for the over-temperature-preventing part may be fixed mechanically with each other. This can reduce influence by displacement or detachment of the over-temperature-preventing part 2 due to load stress, and can stably carry out detection of the abnormal circumstance. Thus, it is possible to operate the over-temperature-preventing part 2 reliably. Such a mechanical fixing includes any physical fixation, for example, using hot melt, stopper or the like.

(Embodiment 2)

A seat heater 20 according to Embodiment 2 of the present invention will be described with reference to FIGS. 3 and 4a-4c.

Figure 3:
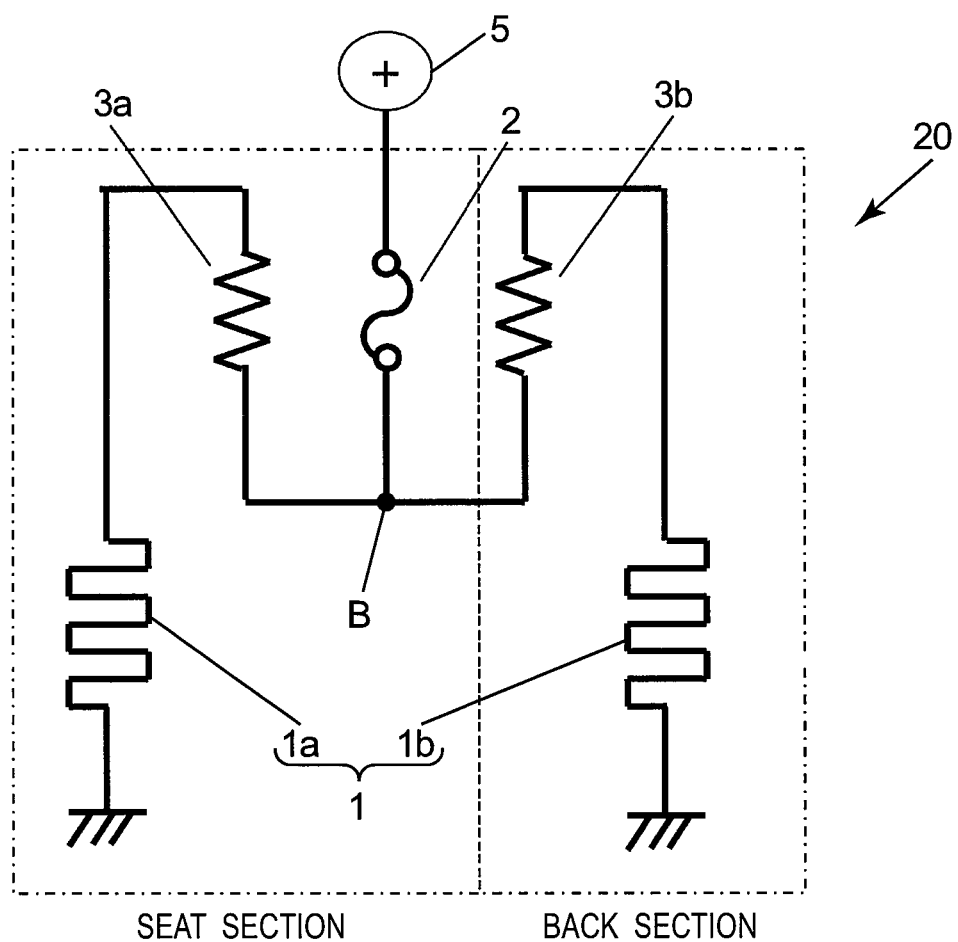
FIG. 3 is a circuit diagram of a seat heater according to Embodiment 2 of the present invention.

FIG. 3 is a circuit diagram of the seat heater 20 according to Embodiment 2.

As shown in FIG. 3, the seat heater 20 according to Embodiment 2 includes two heaters 3a and 3b as heaters 3 for the over-temperature-preventing part 2. That is, there are the heater 3a (first heater 3a) for the over-temperature-preventing part, which is connected to the seat-section-warming heater 1a in series, and the heater 3b (second heater 3b) for the over-temperature-preventing part, which is connected to the back-section-warming heater 1b in series. As shown in FIG. 3, a series circuit electrically-connecting the seat-section-warming heater 1a and the heater 3a for the over-temperature-preventing part is connected to a series circuit electrically-connecting the back-section-warming heater 1b and the heater 3b for the over-temperature-preventing part, at a connection point B in parallel.

According to such a configuration, the over-temperature-preventing part 2 is heated by both the heaters 3a and 3b for the over-temperature-preventing part. Therefore, even if an open circuit occurs in either the seat-section-warming heater 1a or the back-section-warming heater 1b, the heater for the over-temperature-preventing part, which is connected to the other heater where the open circuit does not occur, can heat the over-temperature-preventing part 2, activating that. That is, even when the open circuit and the break-down of the temperature control means both occur, it is possible to ensure safety.

FIGS. 4a-4c are schematic assembly diagrams of the over-temperature-preventing part 2 and the heaters 3a and 3b for the over-temperature-preventing part of the seat heater 20 according to Embodiment 2.

As shown in FIG. 4b, the over-temperature-preventing part 2 is arranged on the heaters 3a, 3b for the over-temperature-preventing part and the base material 4. As shown in FIG. 4c, the heaters 3a, 3b for the over-temperature-preventing part has been sewn to the base material 4 in a folded state such that the heating wires of the heaters 3a, 3b do not have contact with each other and do not protrude from two surfaces of the over-temperature-preventing part 2 (corresponding to the upper and lower surfaces in FIGS. 4b and 4c), the surfaces being temperature-sensitive and having the largest areas of the over-temperature-preventing part 2.

The heaters 3a and 3b for the over-temperature-preventing part are disposed to sandwich the over-temperature-preventing part 2 and to cover the opposite portions including at least the temperature-sensitive portions of the over-temperature-preventing part 2. This can realize effective heating of the over-temperature-preventing part 2, making it possible to increase the temperature of the over-temperature-preventing part 2 at a temperature zone above a maximum temperature in an automobile where the seat heater 20 is being used normally.

Similarly, it is possible to set the activation temperature of the over-temperature-preventing part 2 to the temperature zone exceeding a temperature range in the automobile where the seat heater 20 is being used normally. Such a setting can avoid a trouble, in which, even when the seat heater 20 is properly operating, the over-temperature-preventing part 2 is activated in a normal temperature range in the automobile and then stops the power supply to the seat-warming heater 1.

In Embodiment 2, a heating value (output) of the heater 3b for the over-temperature-preventing part, which is connected to the back-section-warming heater 1b, is set to be larger than a heating value (output) of the heater 3a for the over-temperature-preventing part, which is connected to the seat-section-warming heater 1a. Therefore, even if the open circuit has occurred in the seat-section-warming heater 1a and thus the heater 3a for the over-temperature-preventing part no longer generate heat, the heater 3b heats the over-temperature-preventing part 2. According to such a configuration, the over-temperature-preventing part 2 can be heated sufficiently, thereby minimizing influence by the open circuit of the seat-section-warming heater 1a which may be likely to make the open circuit due to load stress, and thus improving safety.

(Embodiment 3)

A seat heater 30 according to Embodiment 3 of the present invention will be described with reference to FIG. 5.

Figure 5:
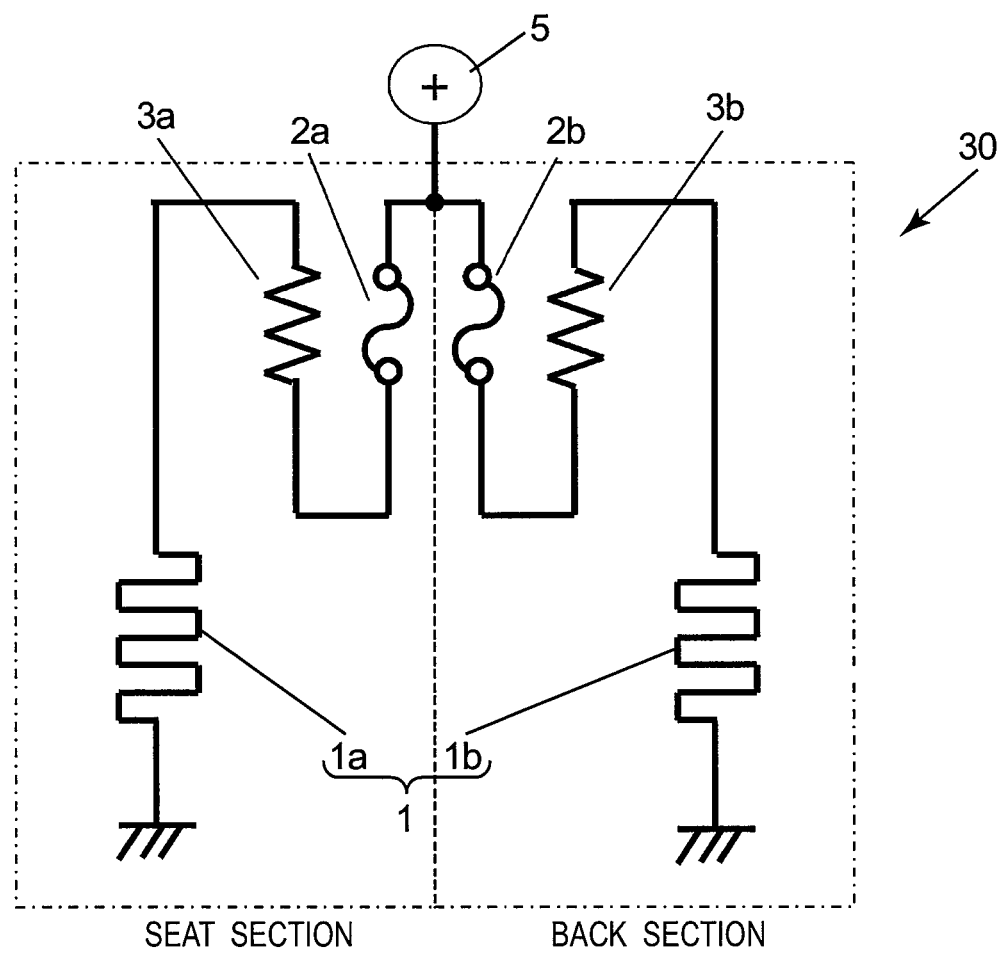
FIG. 5 is a circuit diagram of a seat heater according to Embodiment 3 of the present invention.

FIG. 5 is a circuit diagram of the seat heater 30 according to Embodiment 3.

As shown in FIG. 5, the seat heater 30 according to Embodiment 3 includes two over-temperature-preventing parts 2a and 2b as the over-temperature-preventing part 2. The over-temperature-preventing part 2a (first over-temperature-preventing part 2a) is electrically-connected to the seat-section-warming heater 1a and the heater 3a for the over-temperature heating part in series, while the over-temperature-preventing part 2b (second over-temperature-preventing part 2b) is electrically-connected to the back-section-warming heater 1b and the heater 3b for the over-temperature heating part in series. In the seat heater 30, the seat-section-warming heater 1a is electrically-connected to the back-section-warming heater 1b in parallel, the over-temperature-preventing part 2a and the heater 3a for the over-temperature-preventing part are connected to the seat-section-warming healer 1a, and the over-temperature-preventing part 2b and the heater 3b for the over-temperature-preventing part are connected to the back-section-warming heater 1b.

Such a configuration connects the over-temperature-preventing part 2a to a circuit including the seat-section-warming heater 1a, and also connects the over-temperature-preventing part 2b to a circuit including the back-section-warming heater 1b, thereby reducing current flowing through the respective over-temperature-preventing parts 2a the 2b. Thus, the over-temperature-preventing parts 2a the 2b can be downsized, making it possible to do its arrangement in the seat easily, and can prevent its prominence to the seat surfaces. Thus, it is possible to improve usability of the over-temperature-preventing parts 2a the 2b.

(Embodiment 4)

Figure 6:
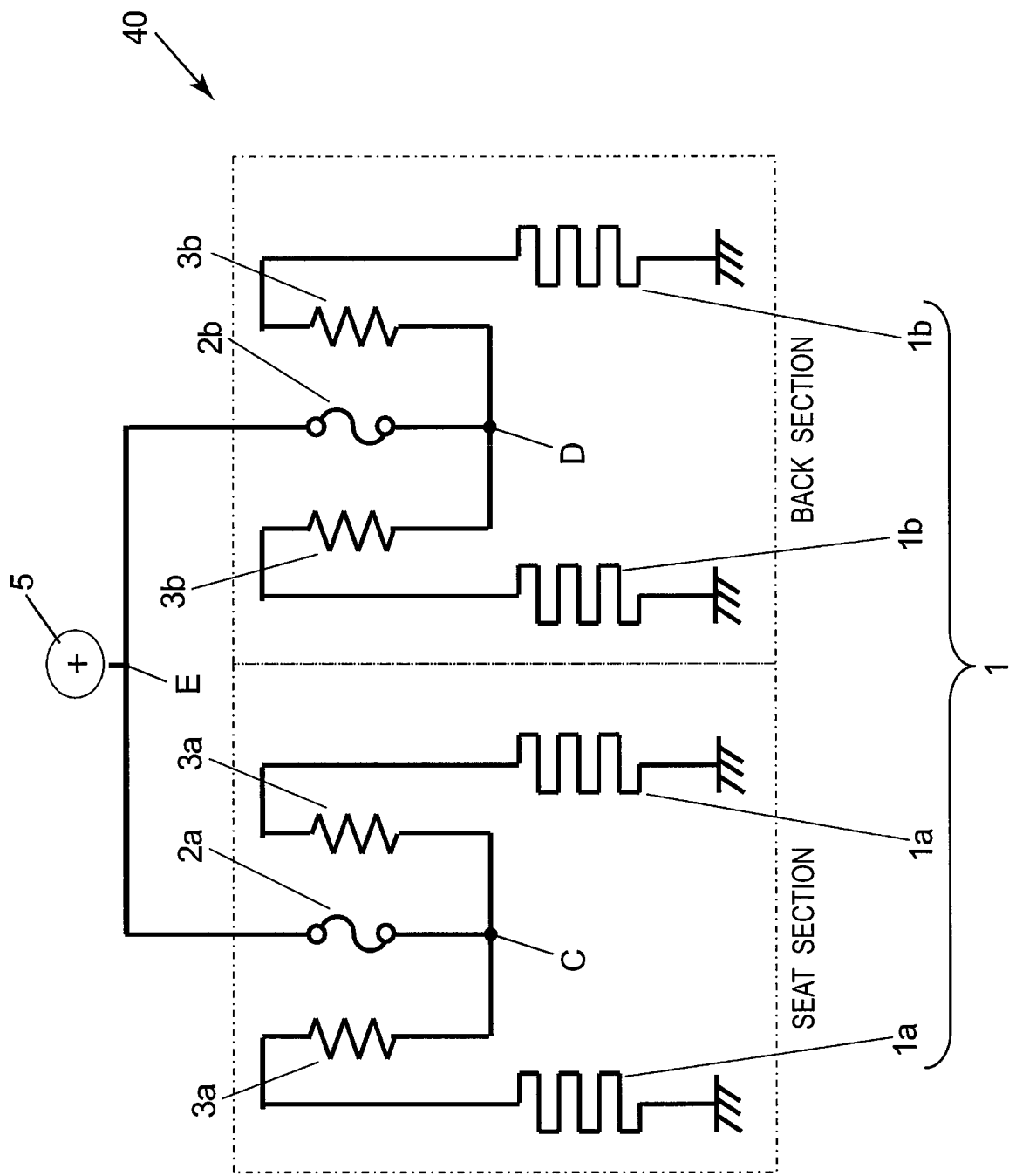
FIG. 6 is a circuit diagram of a seat heater according to Embodiment 4 of the present invention.
Figure 7:
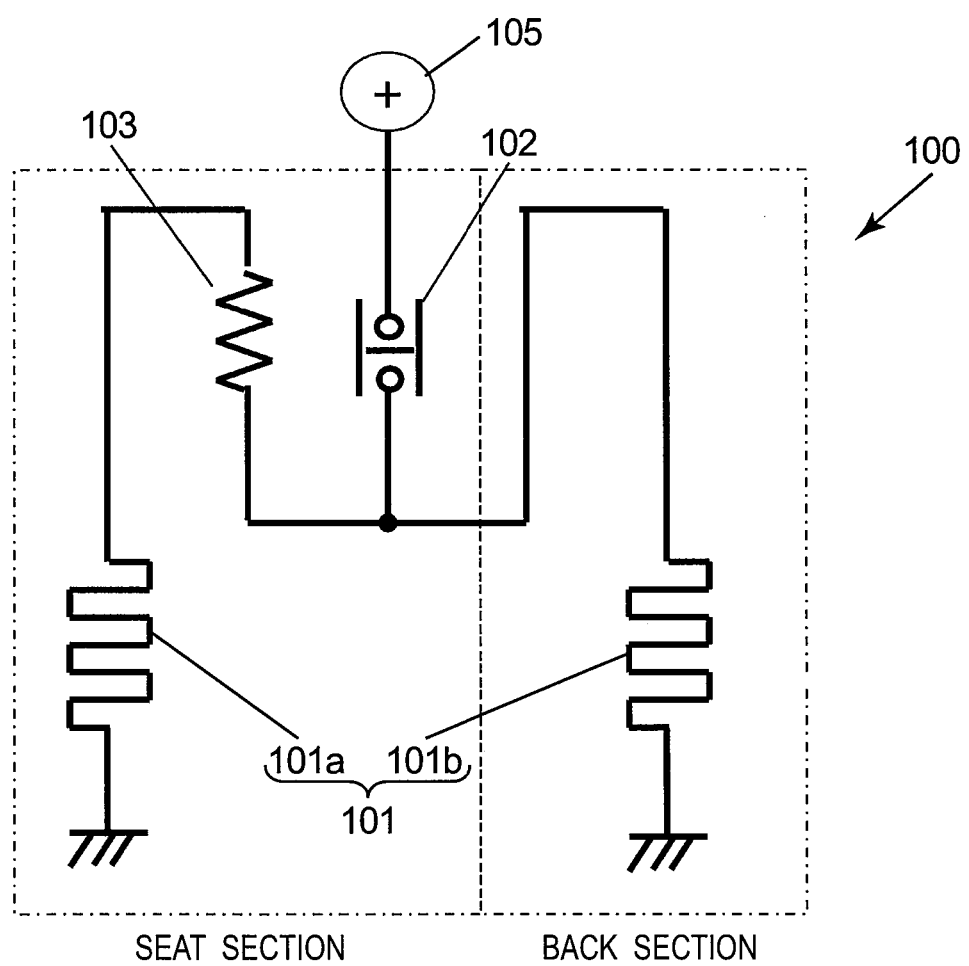
FIG. 7 is a circuit diagram of a conventional seat heater.

A seat heater 40 according to Embodiment 4 of the present invention will be described with reference to FIG. 6.

In Embodiment 4 of the present invention, a pair of seat-section-warming heaters 1a is provided in the seat section of the seat, each of the seat-section-warming heaters 1a being connected to each of the heaters 3a for the over-temperature-preventing part in series, and these series circuits are connected with each other at a connection point C in parallel. In addition, a pair of back-section-warming heaters 1b is provided in the back section of the seat, each of the back-section-warming heaters 1b being connected to each of the heaters 3b for the over-temperature-preventing part in series, and these series circuits are connected with each other at a connection point D in parallel. The parallel circuits in the seat-section and the back-section are connected to the over-temperature-preventing parts 2a and 2b at the connection points C and D, respectively. The over-temperature-preventing parts 2a and 2b are connected with each other at a connection point E in parallel.

In Embodiment 4, the over-temperature-preventing part 2a in the seat-section is heated by the pair of the over-temperature-preventing parts 3a. Therefore, even if an open circuit occurs in either of the pair of seat-section-warming heaters 1a, the heater 3a for the over-temperature-preventing part, which is connected to the other heater where the open circuit does not occur, can heat the over-temperature-preventing part 2a, activating it. That is, even when the open circuit in either of the pair of seat-section-warming heaters 1a and the break-down of the temperature control means both occur, it is possible to ensure safety.

For the back-section of the seat, as is the case in the seat-section described above, the over-temperature-preventing part 2b in the back-section is heated by the pair of heaters 3b for the over-temperature-preventing part. Thus, even when the open circuit in either of the pair of back-section-warming heaters 1b and the break-down of the temperature control means both occur, it is possible to ensure safety.

Figure 4:
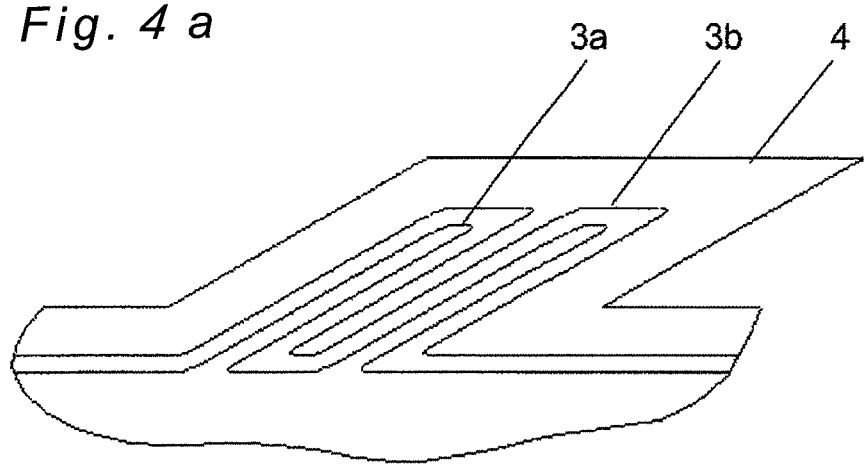
FIG. 4a is a schematic assembly diagram of an over-temperature-preventing part and a heater for the over-temperature-preventing part which the seat heater according to Embodiment 2 includes.
FIG. 4b is a schematic assembly diagram of the over-temperature-preventing part and the heater for the over-temperature-preventing part which the seat heater according to Embodiment 2 includes.
FIG. 4c is a schematic assembly diagram of the over-temperature-preventing part and the heater for the over-temperature-preventing part which the seat heater according to Embodiment 2 includes.
Figure 4:
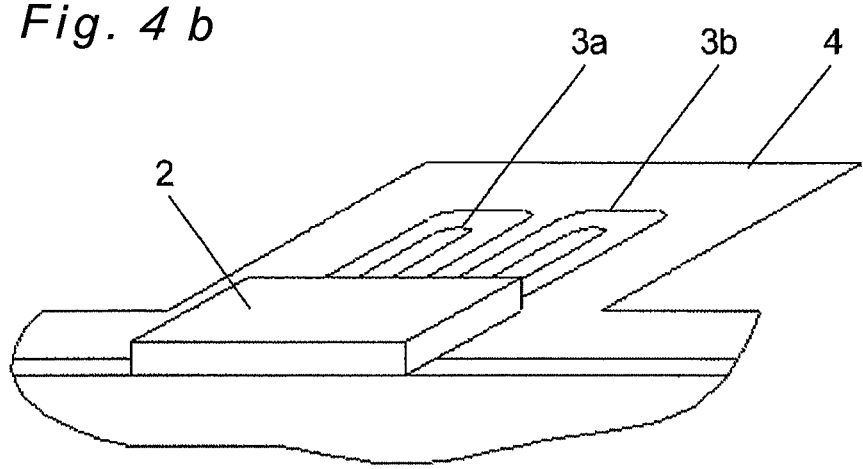
Figure 4:
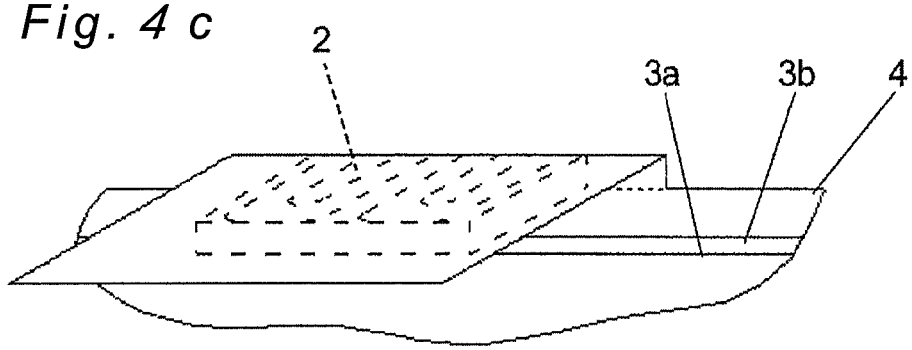

For example, the over-temperature-preventing parts 2a, 2b and the heaters 3a, 3b for the over-temperature-preventing parts according to Embodiment 4 may be attached to one base material 4 as in Embodiment 2 shown in FIG. 4. That is, the pair of heaters 3a for the over-temperature-preventing part may be disposed at positions on the base material 4 corresponding to the seat section, and the pair of the heaters 3b for the over-temperature-preventing part may be disposed at positions of the base material 4 corresponding to the back section.

Activation temperatures of the over-temperature-preventing parts 2a, 2b may be set to temperatures above a maximum temperature in an automobile where the seat heater 40 is being used normally and below a melting temperature or an ignition temperature of neighboring components.

In the seat-section of the seat, even if an open circuit occurs in either of the pair of seat-section-warming heaters 1a, the heater 3a for the over-temperature-preventing part, which is connected to the other heater where the open circuit does not occur, can heat the over-temperature-preventing part 2a to a temperature zone exceeding a temperature range in the automobile where the seat heater 40 is being used normally. Therefore, it is possible to set the activation temperature of the over-temperature-preventing part 2a as well to the temperature zone exceeding the temperature range in the automobile where the seat heater 40 is being used normally. Such a setting can avoid a trouble, in which, even when the seat heater 40 is properly operating, the over-temperature-preventing part 2a is activated in the normal temperature range in the automobile and then stops the power supply to the seat-section-warming heaters 1a.

In addition, for the back-section of the seat, it is possible to set the activation temperature of the over-temperature-preventing part 2b as well to the temperature zone exceeding the maximum temperature in the automobile where the seat heater 40 is being used normally. Such a setting can avoid a trouble, in which, even when the seat heater 40 is properly operating, the over-temperature-preventing part 2b is activated in the normal temperature range in the automobile and then stops the power supply to the back-section-warming heaters 1b.

The seat heater according to the present invention can realize both higher output and safety, which leads to be applicable to seat-heating in vehicles other than automobiles and also applicable to personal residential heatings.

Although the present invention has been fully described by way of preferred embodiments with reference to the accompanying drawings, it is to be noted here that various changes and modifications will be apparent to those skilled in the art. Therefore, unless such changes and modifications otherwise depart from the scope of the present invention as set forth in the appended claims, they should be construed as being included therein.

The contents of a specification, drawings and claims of a Japanese patent application No. 2012-163374 filed Jul. 24, 2012 are herein expressly incorporated by reference in their entirety.

The invention claimed is:

1. A seat heater comprising:
    a seat-warming heater which is connected to a power source and warms a person sitting on a seat;
    an over-temperature-preventing part which disconnects the connection between the seat-warming heater and the power source when the over-temperature-preventing part is heated to a predetermined temperature, so as to prevent over-temperature of the seat-warming heater; and
    a heater which heats the over-temperature-preventing part, wherein
    the over-temperature-preventing part is non-return type, and the heater for the over-temperature-preventing part is disposed to sandwich opposite portions of the over-temperature-preventing part.

2. The seat heater according to claim 1, wherein the seat-warming heater comprises a first seat-warming heater which warms a seat section of the seat and a second seat-warming heater which warms a back section of the seat, the first seat-warming heater and the second seat-warming heater being electrically-connected in parallel with each other, and wherein the over-temperature-preventing part is disposed between the power source and a connection point of the first seat-warming heater and the second seat-warming heater.

3. The seat heater according to claim 1, wherein the heater for the over-temperature-preventing part comprises a first heater for the over-temperature-preventing part, which is electrically-connected in-series to the first seat-warming heater, and a second heater for the over-temperature-preventing part, which is electrically-connected in-series to the second seat-warming heater, and wherein both the first heater and the second heater for the over-temperature-preventing part heat the over-temperature-preventing part.

4. The seat heater according to claim 3, wherein a heating value of the second heater for the over-temperature-preventing part is larger than a heating value of the first heater for the over-temperature-preventing part.

5. The seat heater according to claim 1, wherein the seat-warming heater comprises a first seat-warming heater which warms a seat section of the seat and a second seat-warming heater which warms a back section of the seat, the first seat-warming heater and the second seat-warming heater being electrically-connected in parallel with each other, wherein the heater for the over-temperature-preventing part comprises a first heater for the over-temperature-preventing part, which is electrically-connected in-series to the first seat-warming heater, and a second heater for the over-temperature-preventing part, which is electrically-connected in-series to the second seat-warming heater, the over-temperature-preventing part comprises a first over-temperature-preventing part which is electrically-connected in series to the first seat-warming heater and the first heater for the over-temperature-preventing part, and a second over-temperature-preventing part which is electrically-connected in series to the second seat-warming heater and the second heater for the over-temperature-preventing part, and wherein the first heater for the over-temperature-preventing part heats the first over-temperature-preventing part, and the second heater for the over-temperature-preventing part heats the second over-temperature-preventing part.

6. The seat heater according to claim 1, wherein the over-temperature-preventing part and the heater for the over-temperature-preventing part are disposed in positions not to contact the person sitting on the seat.

7. The seat heater according to claim 1, wherein the over-temperature-preventing part and the heater for the over-temperature-preventing part are mechanically-secured.

8. The seat heater according to claim 1, wherein the heater for the over-temperature-preventing part are disposed so that a part of heating wires constituting the heater for the over-temperature-preventing part has no contact with the other parts of the heating wires.

9. The seat heater according to claim 1, wherein the heater for the over-temperature-preventing part is disposed on a base material, and wherein the heater for the over-temperature-preventing part and the base material are folded to sandwich the opposite portions of the over-temperature-preventing part.

10. The seat heater according to claim 1, wherein the opposite portions of the over-temperature-preventing part include two surfaces of the over-temperature-preventing part, and wherein the two surfaces are temperature-sensitive and having largest areas of the over-temperature-preventing part.

* * * * *